United States Patent
Menon et al.

(10) Patent No.: US 9,958,601 B2
(45) Date of Patent: May 1, 2018

(54) DISPLAY BACKLIGHT

(71) Applicant: University of Utah Research Foundation, Salt Lake City, UT (US)

(72) Inventors: Rajesh Menon, Salt Lake City, UT (US); Arkady Rudnitsky, Salt Lake City, UT (US); Zeev Zalevsky, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 442 days.

(21) Appl. No.: 14/487,218

(22) Filed: Sep. 16, 2014

(65) Prior Publication Data
US 2015/0077644 A1    Mar. 19, 2015

Related U.S. Application Data (60) Provisional application No. 61/879,972, filed on Sep. 19, 2013, provisional application No. 61/923,488, filed on Jan. 3, 2014.

(51) Int. Cl.
*F21V 8/00*    (2006.01)

(52) U.S. Cl.
CPC ......... *G02B 6/0096* (2013.01); *G02B 6/0008* (2013.01); *G02B 6/0045* (2013.01); *G02B 6/0046* (2013.01)

(58) Field of Classification Search
CPC .. G02B 6/0096; G02B 6/0008; G02B 6/0045; G02B 6/0046
USPC .......................... 362/600, 603, 612, 613, 615
See application file for complete search history.

(56) References Cited

U.S. PATENT DOCUMENTS

| | | | |
|---|---|---|---|
| 5,239,450 A * | 8/1993 | Wall | A44C 15/0015 362/103 |
| 6,072,551 A | 6/2000 | Jannson et al. | |
| 6,130,730 A | 10/2000 | Jannson et al. | |
| 6,867,828 B2 * | 3/2005 | Taira | G02B 6/0053 349/65 |
| 7,537,374 B2 * | 5/2009 | Schardt | G02B 6/0055 362/247 |
| 8,294,658 B2 | 10/2012 | Whitehead | |
| 8,351,744 B2 | 1/2013 | Travis et al. | |
| 2003/0048639 A1 * | 3/2003 | Boyd | G02B 6/0031 362/97.3 |

(Continued)

FOREIGN PATENT DOCUMENTS

WO     WO 2013/122728 A1     8/2013

OTHER PUBLICATIONS

Martunov et. al, "High-efficiency slim LED backlight system with mixing light guide," SID, 2013, 3 pages.

(Continued)

*Primary Examiner* — Jong-Suk (James) Lee
*Assistant Examiner* — Christopher E Dunay
(74) *Attorney, Agent, or Firm* — Thorpe North & Western, LLP (57) ABSTRACT

A display backlight can include a light source and a parabolic waveguide. The parabolic waveguide can have a light inlet to receive the light from the light source, a parabolic reflective surface adapted to change a direction of the light emitted from the light source by a predetermined angle, and a light outlet configured to emit the light at the predetermined angle.

30 Claims, 4 Drawing Sheets

(56) References Cited

U.S. PATENT DOCUMENTS

| | | | | |
|---|---|---|---|---|
| 2007/0081361 A1* | 4/2007 | Clary | ................... | G02B 6/0055 362/624 |
| 2007/0297191 A1* | 12/2007 | Sampsell | ............. | G02B 6/0018 362/602 |
| 2009/0046479 A1 | 2/2009 | Bierhuizen et al. | | |
| 2009/0303744 A1* | 12/2009 | Iwasaki | ................ | G02B 6/0041 362/612 |
| 2011/0103036 A1* | 5/2011 | Bosl | ..................... | G02B 5/3033 362/19 |
| 2011/0149594 A1* | 6/2011 | Terajima | .............. | G02B 6/0021 362/606 |
| 2011/0310330 A1 | 12/2011 | Uchida et al. | | |
| 2012/0133857 A1* | 5/2012 | Kim | ........................ | G09F 13/04 349/58 |
| 2013/0216182 A1 | 8/2013 | Ouderkirk | | |
| 2014/0063421 A1* | 3/2014 | You | ....................... | G02F 1/1335 349/106 |
| 2014/0084325 A1* | 3/2014 | Yamanaka | ................ | G02F 2/02 257/98 |
| 2014/0192557 A1* | 7/2014 | Lu | ........................... | G09F 13/14 362/612 |
| 2016/0018582 A1* | 1/2016 | Fiorentino | ............. | G02B 6/002 362/609 |
| 2016/0138777 A1* | 5/2016 | Shen | ....................... | F21K 9/233 362/308 |

OTHER PUBLICATIONS

Minano et. al, "High-efficiency LED backlight optics designed with the flowline method," 2005, 12 pages.

Taira et al, "Planar Collimated Illumination System Using Nano-Hybrid Low Index Materials", FIO/LS Technical Digest, 2011, 2 pages.

Travis et al, "Collimated light from a waveguide for a display backlight," Opt. Exp. 17(22) 19714-19719 (2009).

Wang et al, "Modelling of a Colour Separating Backlight for Liquid Crystal Displays", SID annual general meeting, 2005, 28 pages, Knebworth House, Stevenage, UK.

* cited by examiner

DISPLAY BACKLIGHT

RELATED APPLICATIONS

This application claims the benefit of U.S. Provisional Application Nos. 61/879,972, filed Sep. 19, 2013, and 61/923,488, filed Jan. 3, 2014, each of which is incorporated herein by reference.

BACKGROUND

Many liquid crystal displays are illuminated by a backlight module including a linear strip of light emitting diodes, or LEDs. Typically, LEDs are positioned at the edges of the display and light from the LEDs is guided by a light guide. The light guide usually incorporates small scattering structures to scatter the light in a forward direction of the display. Sometimes, a reflective back surface is used to enhance light recycling by reflecting light in the forward direction. The scattering structures are typically designed to maximize scattering efficiency in the forward direction and also to ensure that the backlight has a uniform brightness across the display.

Many commercial displays use brightness-enhancing films after the backlight in order to collimate the light from the backlight with the goal of increasing on-axis brightness for the display. This not only improves on-axis brightness, it also increases the ON-OFF contrast of the display, improves performance of polarizers which may be used, and allows for private viewing of mobile displays. However, the use of separate optical films for collimating the light tends to decrease the overall efficiency of the display because some light is absorbed before leaving the display. Scattering structures in the light guide can also decrease the efficiency of the display by causing some light to be absorbed or otherwise dissipated.

SUMMARY

A display backlight according to the present technology can generally include a light source and a parabolic waveguide. The parabolic waveguide can have a light inlet to receive the light from the light source, a parabolic reflective surface adapted to change a direction of the light emitted from the light source by a predetermined angle, and a light outlet configured to emit the light at the predetermined angle. In one aspect, the parabolic waveguide can collimate the light from the light source. In another aspect, a collimating lens can collimate the light from the light source prior to the light inlet of the parabolic waveguide.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claim1ng the present invention, the following terminology will be used.

As used herein, the terms "light," "illumination" and "electromagnetic radiation" can be used interchangeably and can refer to light or electromagnetic radiation in the ultraviolet, visible, near infrared and infrared spectra. The terms can further more broadly include electromagnetic radiation such as radio waves, microwaves, x-rays, and gamma rays. Thus, the term "light" is not limited to electromagnetic radiation in the visible spectrum.

It is noted that, as used in this specification and in the appended claims, the singular forms "a," "an," and "the" include plural referents unless the context clearly dictates otherwise. Thus, for example, reference to "a layer" includes one or more of such features, reference to "a light emitting diode" includes reference to one or more of such elements, and reference to "redirecting" includes reference to one or more of such steps.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. The use of "substantially" is equally applicable when used in a negative connotation to refer to the complete or near complete lack of an action, characteristic, property, state, structure, item, or result. Thus, as used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements.

Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Examples of the Technology

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following description should not be considered limiting.

The present technology provides display backlights and devices that can incorporate display parabolic collimating assembly for use in backlights for various displays. In one aspect, the display backlights can provide highly collimated illumination with high optical efficiency in a thin, small form-factor geometry. The backlights can be applied in all forms of displays including LCD and small projection displays.

Figure 1A:
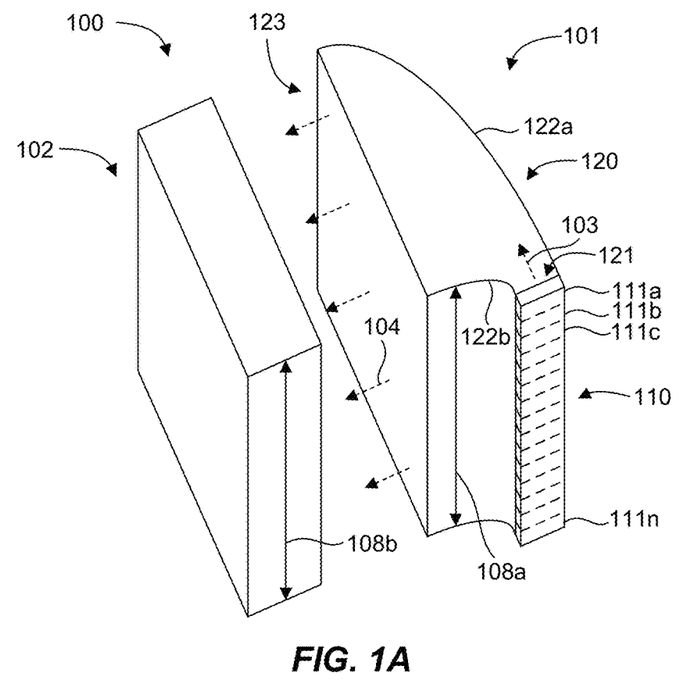
FIG. 1A is a perspective view of a display device in accordance with an example of the present disclosure.
Figure 1B:
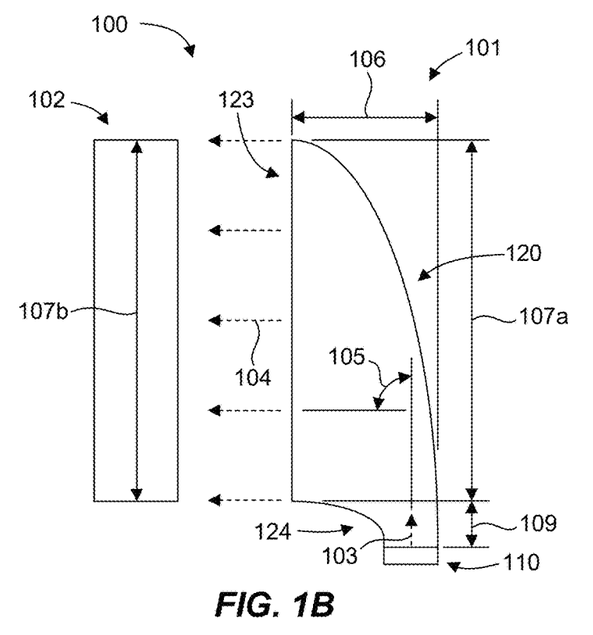
FIG. 1B is a side view of the display device of FIG. 1A.

Referring to FIGS. 1A and 1B, a display device or projector (i.e., a microprojector) 100 can include a display backlight 101 and a display screen 102. The display backlight can include a light source 110 and a parabolic waveguide 120. The parabolic waveguide can be adapted to receive light from the light source. As shown in FIG. 1, the parabolic waveguide can have a light inlet 121 positioned to receive light from the light source. The parabolic waveguide can also have a parabolic reflective surface 122a, 122b adapted to change or alter an incoming direction 103 of the light emitted by the light source by a predetermined angle 105 to an outlet direction 104. The light can be emitted from the parabolic waveguide via a light outlet 123. In one aspect, the parabolic reflective surface of the waveguide can be configured to both change the direction of the light and collimate the light. For example, collimation of the light may be obtained due to the parabolic reflective surfaces acting as lenses that convert light coming from the light source into a plane wave.

As shown in FIGS. 1A and 1B, the parabolic waveguide 120 can be a non-hollow, or solid, waveguide formed of a transparent material which exhibits total internal reflection with respect to the light. Light from the light source 110 can enter the waveguide and reflect internally off the surfaces 122a, 122b of the waveguide under total internal reflection, such that substantially all of the light is directed from the light outlet 123 of the waveguide. Under total internal reflection, the waveguide can operate with very small losses. Total internal reflection is governed both by the refractive index of the waveguide material and the angles at which the light bounces off the surfaces of the waveguide. For example, in a waveguide made from a material with a relatively higher refractive index, the light can bounce off surfaces at a correspondingly steeper angle while still being fully reflected. The parabolic reflecting surface of the waveguide can thus be a surface of the transparent material that is configured to internally reflect the light and change the direction of the light by a predetermined angle. As described above, the parabolic reflective surface can be configured to both change the direction of the light and collimate the light. In another aspect described in more detail below, the parabolic reflective surface can change the direction of pre-collimated light by ray-tracing and determining contours which result in the desired output angles.

A non-hollow waveguide can be formed of a variety of transparent materials. For example, the waveguide can be formed of a transparent plastic. Suitable transparent plastics include, but are not limited to, poly(methyl methacrylate) (PMMA), polyethylene terephthalate (PET), polycarbonate (PC), cyclo olefin polymer (COP), cellulose triacetate (TAC) film, acrylic, and the like. In one example, the waveguide can be formed of glass. The waveguide can be manufactured using standard processes such as injection molding, stamping, etc. Master patterns can be created by lithography, 3D printing, precision machining, etc.

In one aspect, the parabolic reflective surface 122a, 122b can comprise a reflective material. Suitable reflective materials include, but are not limited to, metals such as reflective aluminum, silver coated aluminum, specular films, etc. In some embodiments, the waveguide can be formed from a transparent material with the reflective material conforming to an external surface of the transparent material, forming the parabolic reflective surface. For example, the waveguide can include a piece formed from a transparent material with a parabolic surface, and the parabolic surface can be coated with a layer of reflective material. Waveguides that include reflective materials can redirect light by normal reflection off of the reflective materials, rather than by total internal reflection.

In some embodiments, the waveguide can be free of scattering structures. In many conventional display backlights, scattering structures are used to scatter light forward toward the viewer. However, waveguides according to the present technology can redirect the light without scattering structures by reflecting the light off a parabolic surface as explained above. By directing light toward the viewer using reflection instead of scattering, higher efficiencies can be obtained. In some embodiments optical films can be added downstream to increase the viewing angle if desired (such as for televisions).

The light source 110 can comprise any number of light emitting diodes 111a-n. In one aspect, the light source can comprise a single-color LED. In some embodiments a white LED can be used. Wavelength splitters, or other optics can be integrated subsequent to the parabolic waveguide in order to produce color images. Such color optics are well known and can be readily designed in connection with the systems described herein. However, in some embodiments a strip of colored LEDs can be used. Color mixing can be engineered into the waveguide 120 or an optical film can be added downstream for color mixing. Single color red, blue, and green LEDs can have higher efficiencies than white LEDs, and therefore a display backlight with colored LEDs can be more energy efficient.

In some embodiments, the waveguide 120 can be configured to change the direction of the light by an angle 105 of about 90°. As shown in FIGS. 1A and 1B, the waveguide can receive light from the light source 110 and emit light, which may be collimated, from the light outlet 123. The waveguide can change the direction of the light by 90° so that the emitted light can be directed straight out from the display screen 102 toward a viewer directly in front of the display screen. Such a waveguide can be thin enough to fit in a display device for any suitable device such as a tablet or notebook computer and wide and tall enough to cover the entire display (i.e., extending along the entire display size). For example, the waveguide can have a thickness 106 that can be 1 mm or less to fit in a tablet or notebook computer and a width 107a and height 108a configured to substantially correspond to a width 107b and height 108b, respectively, of the display screen 102. In addition, an inlet portion 124 of the waveguide can have a width 109 of 2 cm or less to facilitate fitting the waveguide in a tablet or notebook computer.

In one aspect, the display screen 102 of the display device 100 can be lit by an array of light emitting diodes positioned at edges of the display screen. For example, LED strips can be placed on edges of the display screen. In some embodiments, one strip of LEDs can be placed along a single edge of the display screen. In other embodiments, LED strips can be placed along two or four edges of the display screen.

In some embodiments, the display device 100 can be a fully transparent display device, comprising primarily transparent components. In this case, the display backlight 101 can include a waveguide made of a transparent material, as explained above. Other transparent components can include liquid crystals, color splitting diffractive optics, optical films, quasi diffractive optical elements, etc., as described in more detail hereinafter. The display backlight can also be used in a micro-projector, such as those used in GOOGLE GLASS®.

Figure 2:
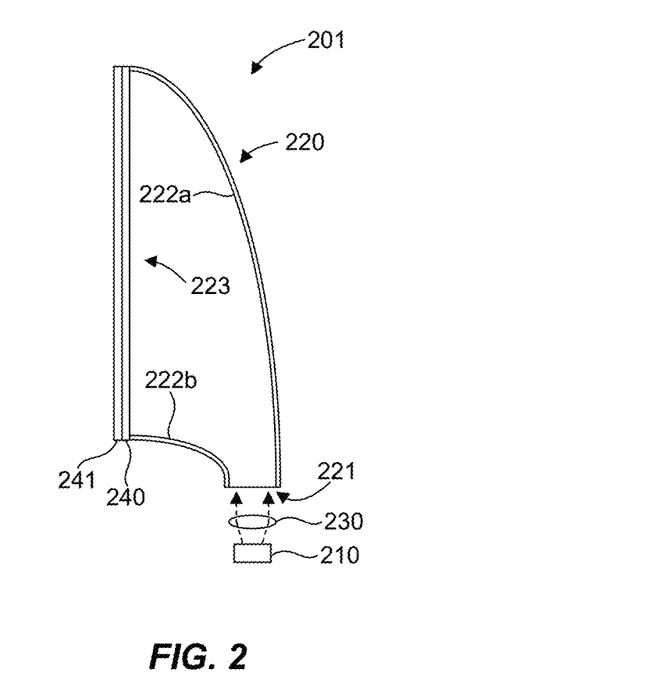
FIG. 2 is a schematic of a display backlight in accordance with an example of the present disclosure.

FIG. 2 illustrates a display backlight 201, in accordance with another example of the present disclosure. As with the display backlight 101 illustrated in FIGS. 1A and 1B, the display backlight 201 can include a light source 210 and a parabolic waveguide 220. In this case, the display backlight can also include a collimating lens 230 positioned between the light source and the light inlet 221 of the parabolic waveguide, to pre-collimate the light before the light enters the parabolic waveguide.

In addition, the parabolic waveguide 220 is illustrated as a hollow waveguide. In one aspect, a parabolic reflective surface 222a, 222b can be an interior surface of the waveguide. The parabolic reflective surface of the hollow waveguide can comprise a reflective material such as those described above. Light from the light source can enter the hollow waveguide through the light inlet and reflect off the parabolic reflective surface so that the direction of the light is changed by a predetermined angle, as described above. Typically, the waveguide can be configured such that the curvature of the walls in all points preserves conditions of total internal reflection so that rays do not escape outside. A hollow waveguide can be formed from any suitable material. In one aspect, the material can be transparent to the wavelength of the transmitted light. In some embodiments, the entire waveguide can be formed of a reflective material such as a reflective metal, so that all internal surfaces are reflective. In other embodiments, the waveguide can be formed of a non-reflective material with a layer of reflective material deposited on an interior surface to form a parabolic reflective surface.

In one aspect, various optical films 240, 241 can be included downstream of the parabolic waveguide 220. In a particular aspect, one or more optical films can be disposed proximate a light outlet 223 of the parabolic waveguide. For example, a diffusing film layer can be used to decollimate the light and increase the viewing angle of the display. The diffusing film can also be optionally designed to have different viewing angles in the horizontal and vertical directions. In embodiments including color LEDs, a color mixing layer can be used to create white light from the colored light (such as red, green, and blue light from red, green, and blue LEDs). A color splitting optical layer, such as a broadband diffractive optic or polychromat, can be used to separate incident white light (collimated) onto red, green, and blue color sub-pixels as per particular requirements of a display device.

Figure 3:
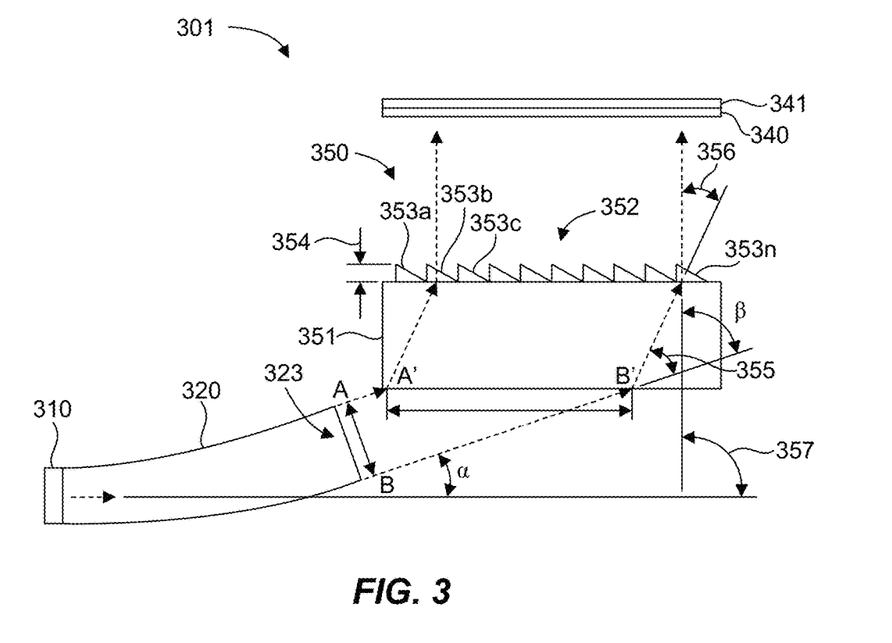
FIG. 3 is schematic of a display backlight in accordance with another example of the present disclosure.

FIG. 3 illustrates a display backlight 301, in accordance with yet another example of the present disclosure. As with the display backlights described above, the display backlight 301 can include a light source 310 and a parabolic waveguide 320. In this case, the display backlight includes a light redirecting device 350 optically associated with a light outlet 323 of the parabolic waveguide. The light redirecting device is adapted to redirect the light from a first predetermined angle α to a second predetermined angle β. In one aspect, the light redirecting device comprises a refractive element 351. In another aspect, the light redirecting device comprises a quasi diffractive optical element (DOE) 352. The refractive element can be disposed between the parabolic waveguide and the quasi diffractive optical element.

In one embodiment, the quasi diffractive optical element 352 can be a prismatic quasi diffractive optical element. The parabolic waveguide (which can be shaped like a funnel, as shown in FIG. 3) can convert light from the light source 310 into a collimated beam with relatively small diameter. For example, the collimated beam can in some cases have a diameter of less than 10 mm, less than 5 mm, or less than 1 mm. The collimated beam at the output of the parabolic waveguide is oriented at the first predetermined angle α toward the light redirecting device 350, which can include the prismatic quasi diffractive optical element disposed on the refractive element 351. In one aspect, the quasi diffractive optical element can be fabricated on the refractive element, which can serve as a support substrate for the quasi diffractive optical element, and can include any number of components 353a-n, such as prisms. The refractive element can comprise a piece of glass or other suitable transparent material. The spot diameter where the collimated beam hits the refractive element is larger than the diameter of the collimated beam because the beam hits the refractive element at a shallow incident angle. In FIG. 3, the beam diameter is denoted as AB, and the spot diameter is denoted as A'B'. These diameters are related by the following equation:

$$A'B' = AB/\sin \alpha \quad \text{(Equation 1)}$$

For small values of the angle α, the diameter of the output beam A'B' is significantly increased in respect to AB. When the beam enters the refractive element 351, the light is bent through refraction at an angle 355 toward the front of a display within a thickness of the refractive element. However, the light may still not be propagating straight out or perpendicular to the display surface as desired. The prismatic quasi DOE 352 can correct the direction of the light by an angle 356 so that the light exits perpendicular to the display surface. This element is termed a "quasi DOE" because a width 354 of the prisms 353a-n can be about 10 to 20 times the wavelength, λ, of the light travelling through the element (i.e., from about 10λ to about 20λ), as opposed to conventional DOEs which have features sized about the same as one wavelength of the light. The larger prism size prevents chromatic aberrations that can be present with conventional DOEs. In some cases, the prisms can have a width of about 5 microns, which is about ten times the minimum optical wavelength. The quasi diffractive optical element can comprise an array of such microprisms. The microprisms can correct the angle of the light by refracting the light as the light enters and exits the microprisms. The microprisms can be formed of materials such as, but not limited to, glass, acrylic, polycarbonate, poly(methyl methacrylate) (PMMA), polyethylene terephthalate (PET), polycarbonate (PC), cyclo olefin polymer (COP), cellulose triacetate (TAC) film, composites and combinations of these materials, and other optically transparent materials.

In another embodiment, the components 353a-n of the quasi diffractive optical element 352 can comprise an array of micro mirrors. The micro mirrors can be statically oriented to reflect the light so that the light is redirected to the second predetermined angle β.

The quasi diffractive optical element 352 can be formed on the surface of a sheet of transparent material, such as a piece of glass, which can serve as the refractive element 351. Other transparent materials can be used, such as the same transparent plastic materials described above for forming a parabolic waveguide. The sheet of transparent material (i.e., the refractive element) can be positioned between the parabolic waveguide 320 and the quasi diffractive optical element 352 so that the beam of collimated light travels from the waveguide through the sheet of transparent material before reaching the quasi diffractive optical element. This can allow the light to change direction by refraction in the sheet of transparent material before the final angle correction is performed by the quasi diffractive optical element. The quasi diffractive optical element can be formed on the surface of the sheet of transparent material by photolithography, electron-beam lithography, embossing, nanoimprint lithography, grayscale lithography, lithography and etching, lithography and resist flowing, lithography and deposition and related techniques to define the prisms and/or mirrors. Similarly, reflective layers can be deposited by a variety of means including physical vapor deposition (PVD), sputtering, chemical vapor deposition (CVD), atomic layer deposition (ALD), painting, spray-coating, dip-coating, etc. The prisms or mirrors may be formed directly on the surface with an adhesion layer to promote adhesion between the prisms (mirrors) to the unpatterned surface. Otherwise, the prisms/mirrors may be glued onto the flat surface using a variety of optically transparent glues.

As explained above, the spot diameter of the beam on the light redirecting device 350 can vary with the angle α and diameter AB of the collimated beam from the parabolic waveguide 320. For example, the waveguide can emit collimated light at an angle less than 90°. The smaller the angle of the beam, the larger the spot diameter will be in comparison with the beam diameter. In some embodiments, the predetermined angle of the collimated beam from the parabolic waveguide can be from about 3° to about 5°. This can result in a large diameter increase when the beam hits the light redirecting device. The light redirecting device can redirect the light a second time so that the final angle 357 is about 90° relative to an inlet direction of the light from the light source. Thus, the light redirecting device can be added downstream of the waveguide to redirect the light toward the viewer, as well as "amplify" or enlarge the diameter or size of the light beam emitted from the parabolic waveguide. In other words, the parabolic waveguide can serve to collimate and direct a beam of light onto the light redirecting device at a given angle such that the size of the beam of light can be enlarged by the light redirecting device prior to being directed at a display screen.

Various optical films 340, 341 can be used downstream of the parabolic waveguide 320 and/or the light redirecting device 350. For example, a diffusion layer can be used to decollimate the light and increase the viewing angle of the display. In embodiments including color LEDs, a color mixing layer can be used to create white light from the colored light (such as red, green, and blue light from red, green, and blue LEDs).

A display backlight as disclosed herein can have a high efficiency, meaning that a high percentage of the light originally produced by the light emitting diode is actually emitted from the display and visible to the viewer. In conventional displays, much of the light produced by LEDs is absorbed and wasted inside the display, making the displays less energy efficient. In inefficient displays, a larger number of LEDs or more powerful LEDs are required to achieve a desired brightness level. This can make the displays more expensive to manufacture and operate. The high efficiency display backlights disclosed herein can reduce the cost of LEDs in the display backlights and increase energy efficiency. In many cases, the display backlight can have an efficiency of 90% or greater. In some cases, the display backlight can have an efficiency of 97% or greater.

Figure 4:
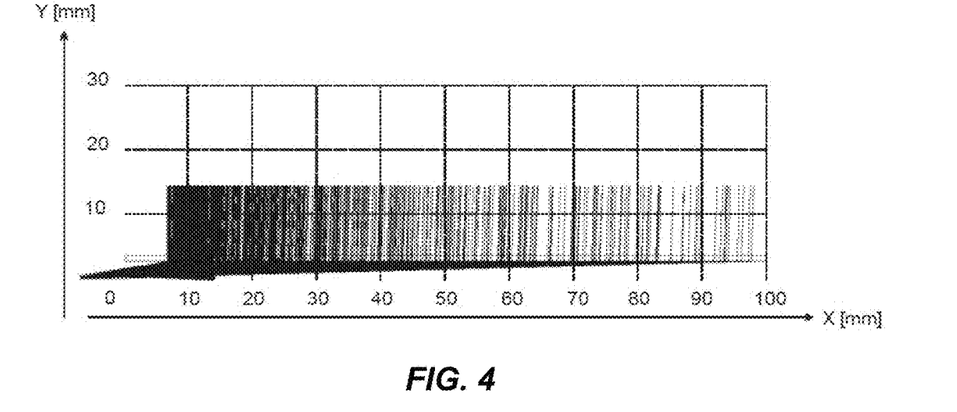
FIG. 4 is a numerical simulation of a display backlight in accordance with an example of the present disclosure.

In addition to high efficiency, a display backlight as disclosed herein can also be engineered to have high uniformity of illumination across the display. FIG. 4 shows results of a Zeemax simulation for a display backlight similar to the embodiment shown in FIG. 3. In this configuration, a display backlight with a thickness (shown on the Y axis in FIG. 4) of only a few mm can generate plane wave illumination for a display having a width of about 10 cm (shown on the X axis in FIG. 4).

Figure 5:
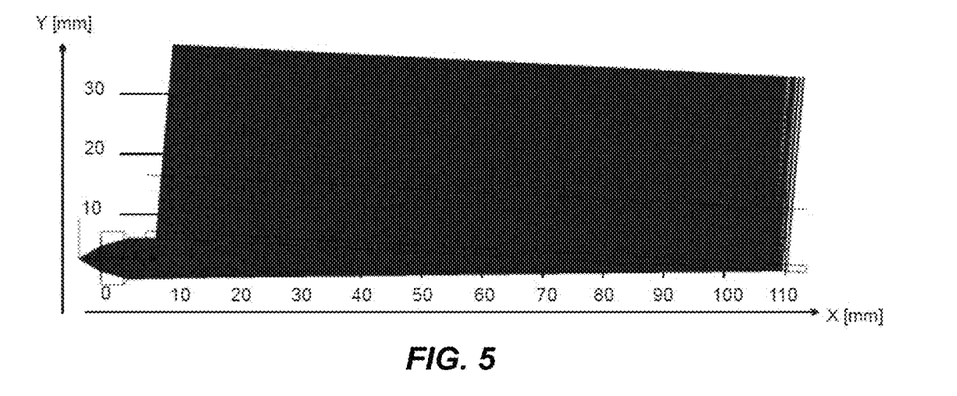
FIG. 5 is a numerical simulation of a display backlight in accordance with an example of the present disclosure.
Figure 6:
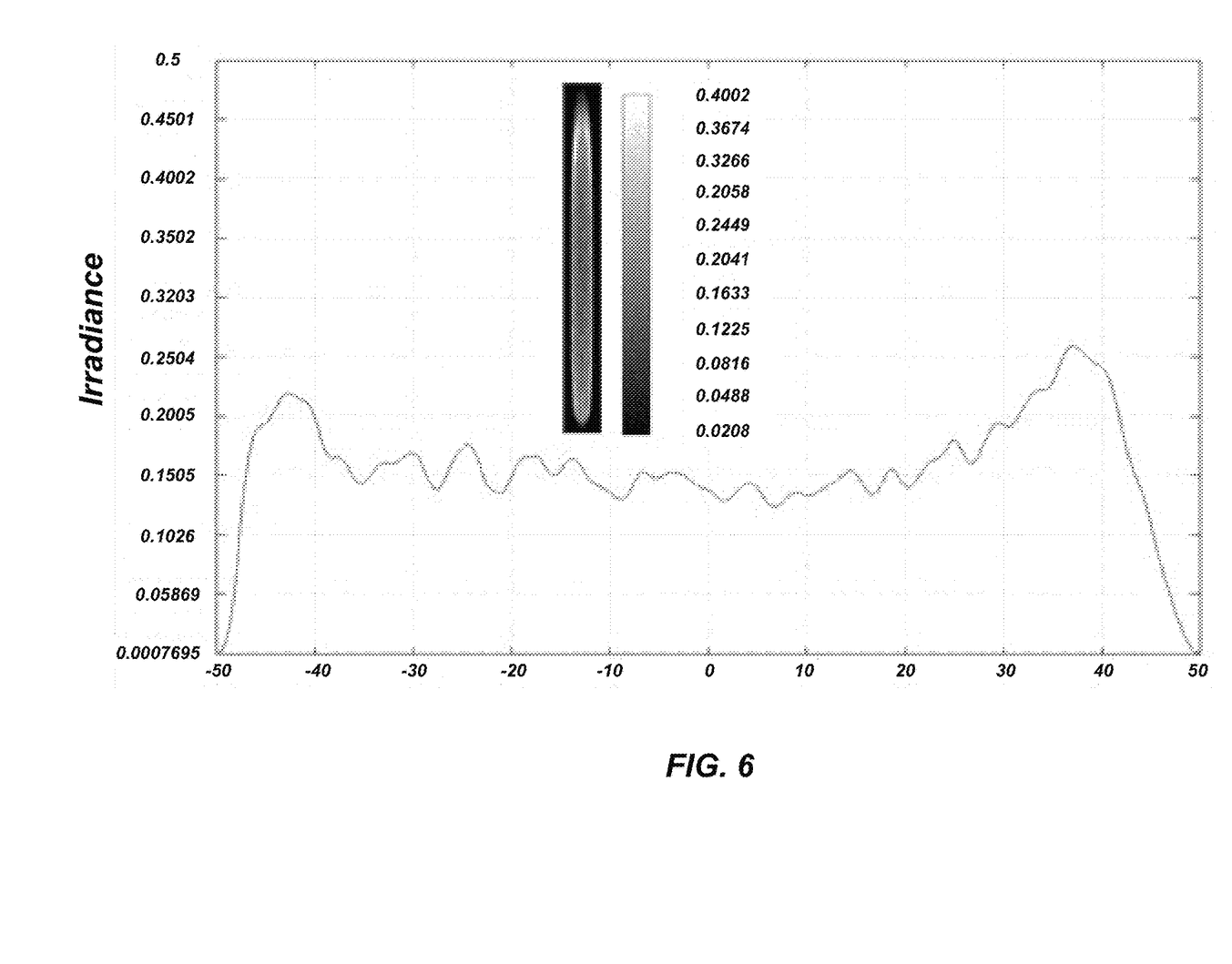
FIG. 6 is a graph of irradiance across a display backlight showing uniformity of illumination in accordance with an example of the present disclosure.

FIG. 5 shows another simulation using a design optimized for uniformity of the display output. The angle of illumination of the light redirecting device in the simulation was 3°. FIG. 6 shows the uniformity of irradiance of the display across the length of the display screen. In the inset, the white color corresponds to bright regions. The obtained total output power is 0.97 W while the input power in the simulation was 1 W (i.e. 97% of input beam energy was utilized). In the central region of the display the non-uniformity is less than 10%.

It should be noted that the simulations seen in FIG. 4 and FIG. 5 are only one layer of the proposed screen. In a full 3D simulation, a strip of LEDs can be used with each LED illuminating a different layer.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A display backlight comprising:
   a light source oriented to emit light in a first direction;
   a parabolic waveguide having a light inlet to receive the light from the light source, a parabolic reflective surface adapted to change a direction of the light emitted from the light source by a predetermined angle, and a light outlet configured to emit the light at the predetermined angle with a first size;
   a first refractive element to receive the light emitted from the light outlet of the parabolic waveguide at the predetermined angle and redirect the light to a second predetermined angle, wherein the parabolic waveguide and the first refractive element are separated by a gap that causes the light emitted from the light outlet to increase to a second size; and
   a second refractive element to receive the light emitted from the first refractive element at the second predetermined angle and redirect the light to a third predetermined angle.

2. The display backlight of claim 1, wherein the parabolic reflective surface is adapted to collimate the light.

3. The display backlight of claim 1, further comprising a collimating lens optically associated with the light inlet to collimate the light.

4. The display backlight of claim 1, wherein the parabolic waveguide is a non-hollow waveguide formed of a transparent material which exhibits total internal reflection with respect to the light.

5. The display backlight of claim 4, wherein the transparent material comprises a transparent plastic.

6. The display backlight of claim 4, wherein the parabolic reflective surface comprises an external surface of the parabolic waveguide.

7. The display backlight of claim 1, wherein the parabolic reflective surface comprises a reflective material.

8. The display backlight of claim 7, wherein the parabolic waveguide is a hollow waveguide and the parabolic reflective surface comprises an interior surface.

9. The display backlight of claim 1, wherein the parabolic waveguide is free of scattering structures.

10. The display backlight of claim 1, wherein the light source comprises a single-color light emitting diode.

11. The display backlight of claim 1, wherein the light source comprises a plurality of single-color light emitting diodes, wherein at least two of the plurality of single-color light emitting diodes are configured to emit light of different colors, and wherein the parabolic waveguide is configured to mix colors from the plurality of single-color light emitting diodes.

12. The display backlight of claim 11, wherein the parabolic waveguide comprises an optical film optically associated with the light outlet and configured to mix colors from the plurality of single-color light emitting diodes.

13. The display backlight of claim 11, wherein each of the plurality of single-color light emitting diodes is selected from the group consisting of a white light emitting diode, a red light emitting diode, a green light emitting diode, and a blue light emitting diode.

14. The display backlight of claim 1, wherein the predetermined angle is about 90°.

15. The display backlight of claim 1, wherein the predetermined angle is less than 90°.

16. The display backlight of claim 1, wherein the first refractive element and the second refractive element comprise a light redirecting device optically associated with the light outlet of the parabolic waveguide, wherein the light redirecting device is adapted to redirect the light from the first predetermined angle to a second predetermined angle.

17. The display backlight of claim 16, wherein the second refractive element is a quasi diffractive optical element.

18. The display backlight of claim 17, wherein the quasi diffractive optical element comprises an array of micro mirrors.

19. The display backlight of claim 17, wherein the quasi diffractive optical element comprises an array of microprisms.

20. The display backlight of claim 19, wherein the light source is adapted to emit light of wavelength $\lambda$, and each of the microprisms has a width of about 10-20 $\lambda$.

21. The display backlight of claim 16, wherein the light redirecting device further comprises the first refractive element between the parabolic waveguide and the quasi diffractive optical element.

22. The display backlight of claim 21, wherein the quasi diffractive optical element is disposed on a surface of the first refractive element.

23. The display backlight of claim 21, wherein the first refractive element comprises a sheet of transparent material.

24. The display backlight of claim 16, wherein the first predetermined angle is from about 3° to about 5°.

25. The display backlight of claim 1, further comprising an optical film optically associated with the light outlet of the parabolic waveguide, wherein the optical film is configured to decollimate the light.

26. The display backlight of claim 1, wherein the efficiency of the collimating display backlight is 97% or greater.

27. A display device comprising the display backlight of claim 1 and a display screen oriented to receive light from the display backlight.

28. The display device of claim 27, wherein the display is substantially fully-transparent.

29. The display device of claim 27, wherein the light source comprises an array of light emitting diodes positioned at an edge of the display screen.

30. A microprojector comprising the display backlight of claim 1 and a display screen oriented to receive light from the display backlight.

* * * * *